United States Patent
Ko et al.

(10) Patent No.: US 7,810,943 B2
(45) Date of Patent: Oct. 12, 2010

(54) LAMP SUPPORT UNIT RESILIENTLY FIXING A LAMP, AND BACKLIGHT ASSEMBLY AND LIQUID CRYSTAL DISPLAY INCLUDING THE LAMP SUPPORT UNIT

(75) Inventors: Kyung Rok Ko, Suwon (KR); Jae Hwan Chun, Suwon (KR); John Seung Han, Seoul (KR); Young Jae Lee, Yongin (KR); Hyun Su Park, Suwon (KR); Joo Young Kim, Cheonan (KR)

(73) Assignee: Samsung Electronics Co., Ltd. (KR)

( * ) Notice: Subject to any disclaimer, the term of this patent is extended or adjusted under 35 U.S.C. 154(b) by 155 days.

(21) Appl. No.: 11/626,445

(22) Filed: Jan. 24, 2007

(65) Prior Publication Data

US 2007/0183149 A1    Aug. 9, 2007

(30) Foreign Application Priority Data

Jan. 24, 2006    (KR)    ...................... 10-2006-0007388

(51) Int. Cl.
| | |
|---|---|
| G02F 1/13357 | (2006.01) |
| F21V 7/04 | (2006.01) |
| H01R 13/627 | (2006.01) |
| H01R 33/97 | (2006.01) |
| H01R 33/08 | (2006.01) |
| F21S 4/00 | (2006.01) |

(52) U.S. Cl. ................. 362/97.2; 362/217.09; 362/225; 362/613; 362/656; 439/232; 439/239; 439/263

(58) Field of Classification Search ................. 362/225, 362/221, 222, 613, 614, 631, 633, 634, 632, 362/655, 656, 97.1, 97.2, 97.4, 217.08, 217.09; 439/232, 233, 239, 240, 241, 263; 349/62, 349/65, 67, 70; 248/50
See application file for complete search history.

(56) References Cited

U.S. PATENT DOCUMENTS

| | | | |
|---|---|---|---|
| 2,287,276 A * | 6/1942 | Runge | 439/232 |
| 2,338,835 A * | 1/1944 | Bryant | 439/241 |
| 2,374,032 A * | 4/1945 | Mueller | 362/217.08 |
| D160,870 S * | 11/1950 | Lane | 362/217.08 |
| 2,663,851 A * | 12/1953 | Pistey | 439/232 |
| 5,211,128 A * | 5/1993 | Katoh et al. | 116/288 |
| 5,211,464 A * | 5/1993 | Bohmer | 362/634 |
| 5,569,042 A * | 10/1996 | Mosebach | 439/237 |
| 5,688,139 A * | 11/1997 | Gust et al. | 439/239 |
| 6,441,874 B1 * | 8/2002 | Saito et al. | 349/70 |
| 6,469,428 B1 * | 10/2002 | Thiel et al. | 362/652 |

(Continued)

FOREIGN PATENT DOCUMENTS

JP    06242321 A *    9/1994

*Primary Examiner*—Alan Cariaso
(74) *Attorney, Agent, or Firm*—Cantor Colburn LLP

(57) ABSTRACT

The present invention relates to a lamp support capable of stably and firmly mounting a lamp, and a backlight assembly and a liquid crystal display including the lamp support unit. The lamp support unit includes a socket housing, a socket terminal disposed in the socket housing gripping a lead of a lamp and a supporting member installed to the socket housing and supporting a lamp tube of the lamp.

32 Claims, 12 Drawing Sheets

U.S. PATENT DOCUMENTS

| | | | |
|---|---|---|---|
| 6,590,626 B1 * | 7/2003 | Suzuki et al. | 349/70 |
| 6,749,315 B2 * | 6/2004 | Moon et al. | 362/97.1 |
| 6,796,678 B2 * | 9/2004 | Moon | 362/225 |
| 6,869,298 B2 * | 3/2005 | Latsis | 439/157 |
| 6,869,300 B2 * | 3/2005 | Lefki et al. | 439/232 |
| 6,962,429 B2 * | 11/2005 | Yamamoto | 362/614 |
| 7,086,775 B2 * | 8/2006 | Huang et al. | 362/652 |
| 7,090,387 B2 * | 8/2006 | Kohno | 362/561 |
| 7,167,219 B2 * | 1/2007 | Huang et al. | 349/60 |
| 7,172,330 B2 * | 2/2007 | Lee et al. | 362/634 |
| 7,258,462 B2 * | 8/2007 | Yamashita et al. | 362/225 |
| 7,287,893 B2 * | 10/2007 | Kruijt et al. | 362/614 |
| 7,325,964 B2 * | 2/2008 | Kim | 362/634 |
| 2006/0050202 A1 * | 3/2006 | Park et al. | 349/70 |

\* cited by examiner

LAMP SUPPORT UNIT RESILIENTLY FIXING A LAMP, AND BACKLIGHT ASSEMBLY AND LIQUID CRYSTAL DISPLAY INCLUDING THE LAMP SUPPORT UNIT

This application claims priority to Korean Patent Application 10-2006-0007388 filed Jan. 24, 2006 and all the benefits accruing therefrom under 35 U.S.C. §119, the contents of which are herein incorporated by reference in its entirety.

BACKGROUND OF THE INVENTION

1. Field of the Invention

The present invention relates to a liquid crystal display. More particularly, the present invention relates to a lamp support unit capable of stably and firmly mounting a lamp, and a backlight assembly and a liquid crystal display including the lamp support unit.

2. Description of the Related Art

In general, a transmissive or transflective liquid crystal display (LCD), except a reflective LCD using external incident light such as natural light, employs a light source of a backlight assembly to display images. This backlight assembly is classified into an edge type and a direct type according to the position of the light source. In the edge type backlight assembly, a light guide plate is installed below a LCD panel and a light source is installed to one side of the light guide plate such that light incident on the side of the light guide plate can be vertically outputted and irradiated to the LCD panel. On the other hand, in the direct type backlight assembly, a plurality of light sources are placed below a LCD panel to directly irradiate a front surface of the LCD panel. The light source may be a fluorescent lamp or a light emitting diode, but the fluorescent lamp can be generally used in a medium- or large-sized liquid crystal display.

In order to fix this fluorescent lamp into the liquid crystal display, a lamp socket is generally used in the direct type while a lamp holder is generally used in the edge type. However, since the conventional lamp socket or holder is configured such that a lamp can be easily moved in a longitudinal and/or radial direction (vertical or horizontal direction) due to an external impact, the fluorescent lamp may be easily separated from the lamp socket or holder. If the fluorescent lamp is separated from its suitable position, distances between adjacent fluorescent lamps are changed and thus the uniformity of brightness is deteriorated.

In particular, in a case where a lamp socket is used, a lead of the fluorescent lamp is gripped only by the lamp socket. Thus, the lead of the fluorescent lamp may be bent due to an external impact. As a result, distances between adjacent fluorescent lamps can be changed to thereby deteriorate the uniformity of brightness. Furthermore, since fine cracks may be produced at junction portions between the lead and tube of the fluorescent lamp, gas may slowly leak out of the fluorescent lamp. In addition, it may result in the failure or malfunction of the fluorescent lamp.

Alternatively, in a case where a lamp holder is used, an assembling process of soldering a wire to the lead of the fluorescent lamp and fixing one end of the lamp tube to the lamp holder is not easily conducted. Furthermore, heat radiation is deteriorated due to a lamp holder and a lamp cover supporting the lamp holder, and thus, the brightness characteristic is also deteriorated.

BRIEF SUMMARY OF THE INVENTION

One exemplary embodiment provides a lamp support unit capable of improving a brightness characteristic of a fluorescent lamp and a backlight assembly and a liquid crystal display including the lamp support unit.

Another exemplary embodiment provides a lamp support unit capable of mounting a fluorescent lamp stably and firmly not to be separated from its proper position, and a backlight assembly and a liquid crystal display including the lamp support unit.

In another exemplary embodiment, there is provided a lamp support unit including a socket housing, a socket terminal disposed in the socket housing and gripping a lead of a lamp and a supporting member installed to the socket housing and supporting a lamp tube of the lamp.

In another exemplary embodiment, the supporting member may include a tube seating groove in which the lamp tube is inserted.

In another exemplary embodiment, an entrance of the tube seating groove may be sized smaller than an outer diameter of the lamp tube.

In another exemplary embodiment, the tube seating groove has an inner diameter greater than the outer diameter of the lamp tube.

In another exemplary embodiment, the supporting member may be made of a cushioning material.

In another exemplary embodiment, the cushioning material is one of a silicone resin, rubber, sponge and a combination including at least one of the foregoing.

In another exemplary embodiment, the socket terminal may include a lead coupling portion gripping the lead and be mounted to be resiliently movable with respect to the socket housing.

In another exemplary embodiment, a base end of the socket terminal is fixed to the socket housing.

In an alternative exemplary embodiment, a base end of the socket terminal is fixed to a printed circuit board electrically connected to the socket terminal.

In another exemplary embodiment, the supporting member may include a connecting portion connected to the socket housing and gripping arms extending from the connecting portion in right and left directions and forming the tube seating groove that surrounds a part of an outer circumference of the lamp tube.

In another exemplary embodiment, the supporting member may be made of a resin.

In another exemplary embodiment, the socket housing may be made of a resin and form a single unit with the supporting member.

In another exemplary embodiment, the socket housing and the supporting member are formed through a two-component injection molding technique.

In another exemplary embodiment, the socket housing includes a coupling groove and the supporting member includes a protrusion corresponding to the coupling groove.

In another exemplary embodiment, the socket terminal may include a lead coupling portion gripping the lead and fixed to the socket housing.

In another exemplary embodiment, the connecting portion is elastic.

In another exemplary embodiment, the supporting member may be made of a cushioning material and an entrance of the supporting member may be sized to be equal to or greater than an outer diameter of the lamp tube.

In another exemplary embodiment, there is provided a backlight assembly including a lamp and a lamp support unit supporting at least one end of the lamp. The lamp support unit includes a socket housing, a socket terminal disposed in the socket housing and gripping a lead of a lamp and a supporting member installed to the socket housing and supporting a lamp tube of the lamp.

In another exemplary embodiment, there is provided a liquid crystal display including a liquid crystal display panel, a lamp installed below the liquid crystal display panel and a lamp support unit supporting at least one end of the lamp. The lamp support unit includes a socket housing, a socket terminal disposed in the socket housing and gripping a lead of a lamp and a supporting member installed to the socket housing and supporting a lamp tube of the lamp.

In another exemplary embodiment, there is provided a lamp support unit, including a connecting portion fixed to a receiving case of a liquid crystal display and a clip-shaped gripping arm extending from the connecting portion and forming a tube seating groove that surrounds a part of an outer circumference of a lamp tube.

In another exemplary embodiment, a plurality of tube seating grooves are arranged in parallel with one another.

In another exemplary embodiment, he lamp support unit may be made of a resin.

In another exemplary embodiment, there is provided a backlight assembly including a light guide plate, a lamp disposed at one side of the light guide plate and a lamp support unit for supporting at least one end of the lamp. The lamp support unit includes a connecting portion fixed to a receiving case of a liquid crystal display and a clip-shaped gripping arm extending from the connecting portion forming a tube seating groove that surrounds a part of an outer circumference of a lamp tube.

In another exemplary embodiment, the backlight assembly may further include a reflective plate disposed below the light guide plate and extending up to an upper edge of the light guide plate to surround a part of the lamp.

In another exemplary embodiment, there is provided a liquid crystal display including a liquid crystal display panel, a backlight assembly including a light guide plate installed below the liquid crystal display panel and a lamp support unit fixing a lamp to one side of the light guide plate and a receiving case accommodating the liquid crystal display panel and the backlight assembly. The lamp support unit includes a connecting portion fixed to a receiving case of a liquid crystal display and a clip-shaped gripping arm extending from the connecting portion forming a tube seating groove that surrounds a part of an outer circumference of a lamp tube.

In another exemplary embodiment, the connecting portion of the lamp support unit is fixed to a bottom chassis of the receiving case. The liquid crystal display may further include a reflective plate disposed below the light guide plate and extending up to an upper edge of the light guide plate to surround a part of the lamp.

BRIEF DESCRIPTION OF THE DRAWINGS

The above and other objects, features and advantages of the present invention will become apparent from the following descriptions of preferred embodiments given in conjunction with the accompanying drawings, in which.

DETAILED DESCRIPTION OF THE INVENTION

Figure 1:
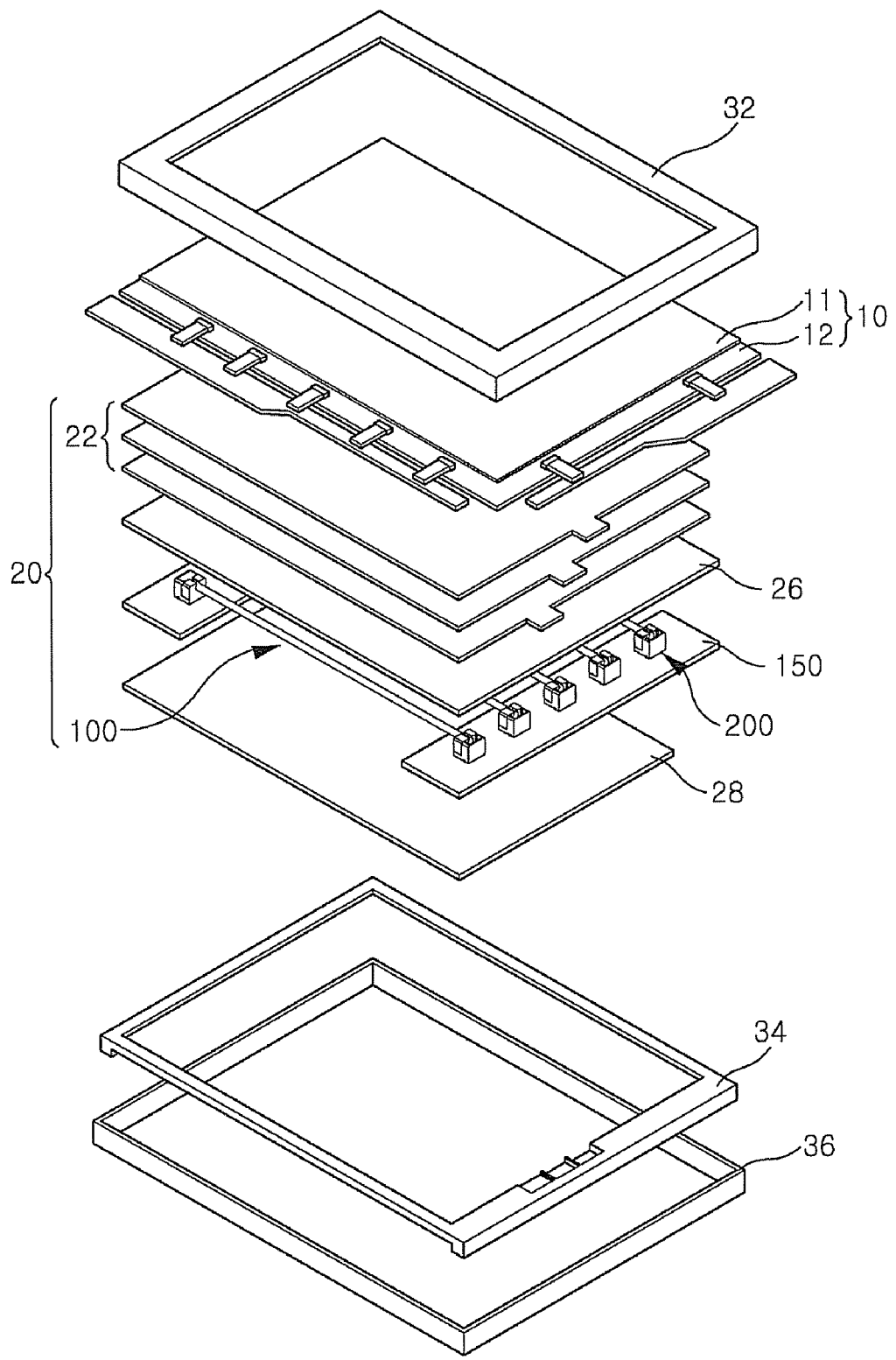
FIG. 1 is a schematic exploded perspective view showing an exemplary embodiment of a liquid crystal display to which a lamp support unit is applied according to the present invention.

Hereinafter, exemplary embodiments of a lamp support unit to which a fluorescent lamp is applied, and a backlight assembly and a liquid crystal display including the lamp support unit according to the present invention so configured will be described with reference to the accompanying drawings. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. Like numbers refer to like elements throughout. As used herein, the term "and/or" includes any and all combinations of one or more of the associated listed items.

Spatially relative terms, such as "below", "lower", "above", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

Figure 2:
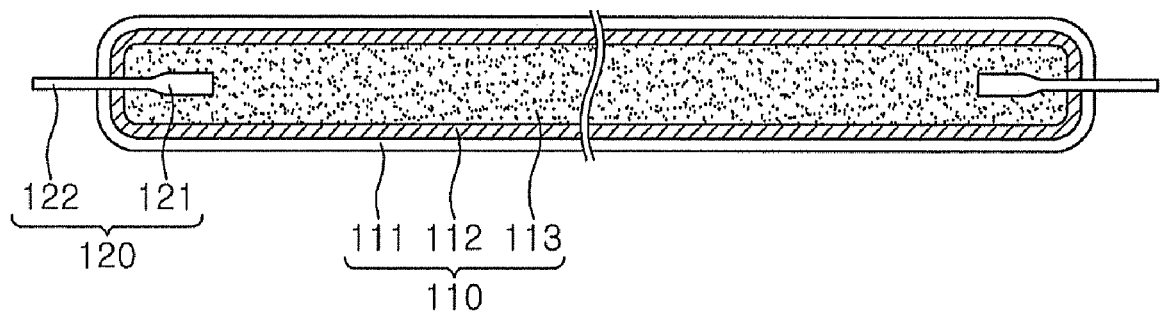
FIG. 2 is a cross-sectional view of an exemplary embodiment of a fluorescent lamp used in a liquid crystal display according to the present invention.
Figure 5:
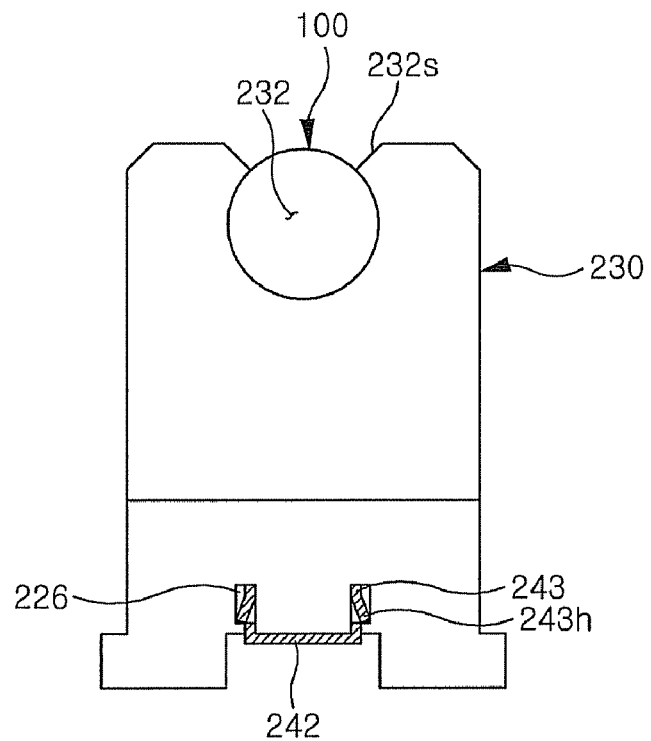
FIGS. 5 and 6 are cross-sectional views taken along lines V-V and VI-VI of FIG. 4, respectively.
Figure 6:
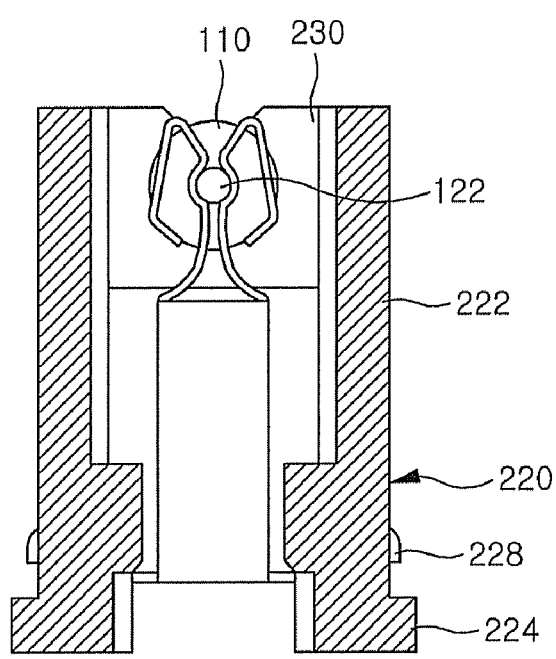

FIG. 1 is a schematic exploded perspective view of an exemplary embodiment of a liquid crystal display (LCD) to which a lamp support unit is applied according to the present invention. FIG. 2 is a cross-sectional view of a fluorescent lamp used in the LCD. FIGS. 3 to 6 include perspective views, plan views and sectional views showing exemplary embodiments of a lamp socket serving as a lamp support unit according to the present invention, respectively. Here, FIGS. 5 and 6 are cross-sectional views taken along lines V-V and VI-VI of FIG. 4, respectively.

Referring first to FIG. 1, an LCD to which a lamp support unit is applied includes an LCD panel 10 including a color filter substrate 11 and a thin film transistor substrate 12, a backlight assembly 20 providing light to the LCD panel 10 and an receiving case including a top chassis 32, a mold frame 34 and a bottom chassis 36 supporting and protecting the LCD panel 10 and the backlight assembly 20.

The backlight assembly 20 disposed below the LCD panel 10 includes a light source 100, such as a fluorescent lamp generating light, a diffusion plate 26 disposed above the fluorescent lamp 100 and diffusing the light generated from the fluorescent lamp 100, a plurality of optical sheets 22 disposed between the diffusion plate and the LCD panel 10 and forming the light into a desired shape and a reflection plate 28 reflecting the downwardly leaked light in an substantially upward direction.

A plurality of the fluorescent lamp 100 includes the fluorescent lamps 100 arranged substantially in parallel with one another and/or at regular intervals. As shown in the illustrated embodiment of FIG. 2, each of the fluorescent lamps 100 includes a lamp tube 110 and electrodes 120 formed at both ends of the lamp tube 110. The lamp tube 110 includes a tube body 111, a fluorescent material layer 112 that may be coated on an inner surface of the tube body 111 and a discharge gas 113 filled in the tube body 111. The tube body 111 may be made of glass.

Each of the electrodes 120 includes a lamp electrode 121 and a lead 122 arranged respectively to inner and outer sides of the tube body 111. In one exemplary embodiment, the fluorescent lamp 100 may generate ultraviolet rays when the discharge gas 113 in the lamp tube 110 is excited when electric power is supplied to the lamp electrode 121 through the lead 122 from the outside of the lamp 100. The ultraviolet rays are converted into visible rays while passing through the fluorescent material layer 112.

Both ends of the fluorescent lamp 100 are electrically connected to printed circuit boards (PCBs) 150 installed at opposite ends of the bottom chassis 36, respectively. Particularly, each end of the fluorescent lamp 100 is supported by a lamp socket 200 serving as a lamp support unit. The lamp socket 200 is seated on the bottom chassis 36 and fixed to the PCB 150.

Figure 3A:
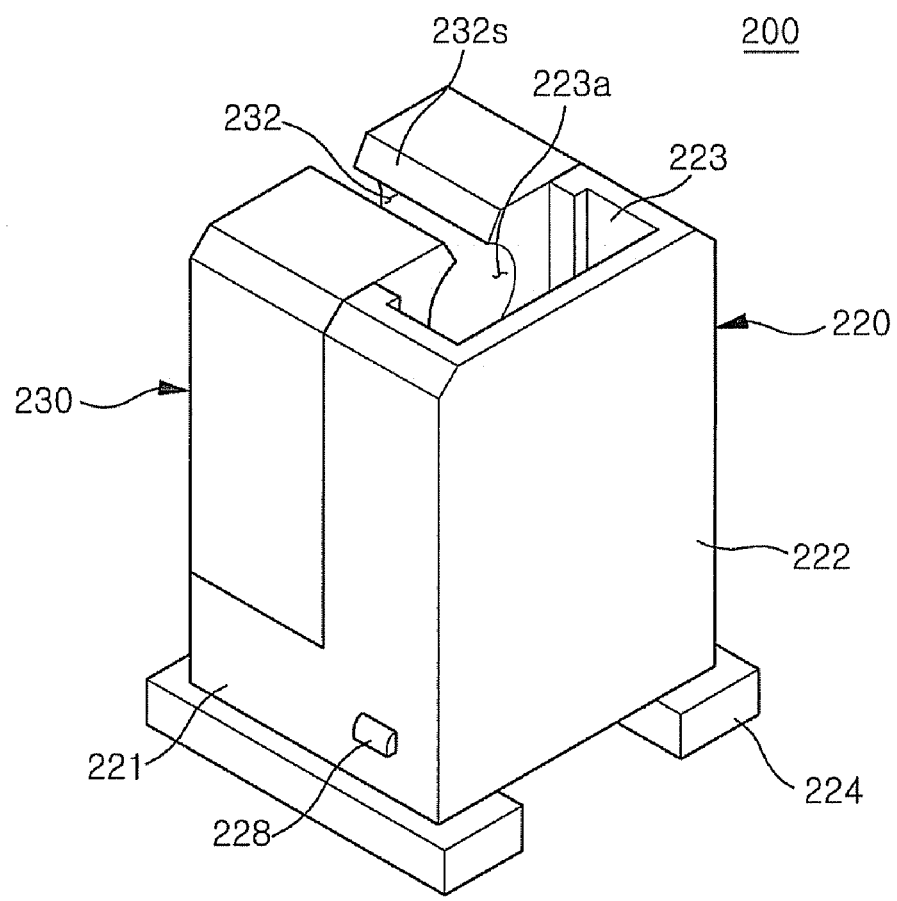
FIGS. 3A, 3B and 4 are exploded perspective views and a plan view showing an exemplary embodiment of a lamp socket corresponding to a lamp support unit according to the present invention, respectively.
Figure 3B:
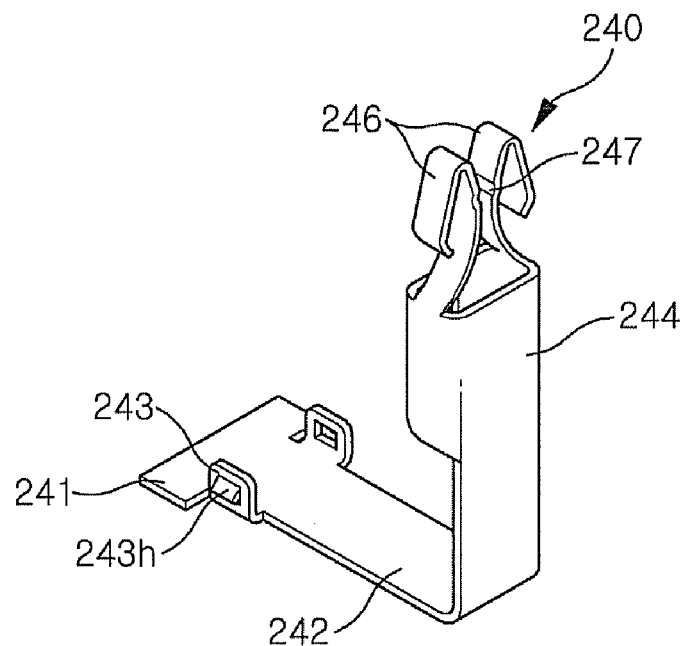
Figure 4:
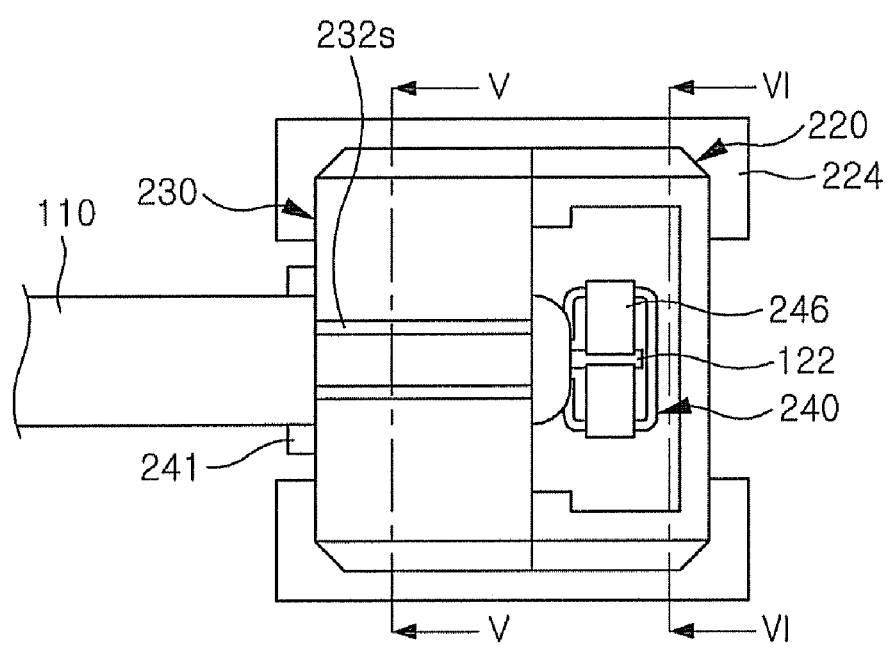

Referring to FIGS. 3A and 3B, the electrodes 120 disposed at both ends of the fluorescent lamp 100 are electrically connected to and supplied with electricity from the PCBs 150 through socket terminals 240 of the lamp sockets 200. Alternative embodiments include configurations where both ends of the fluorescent lamp 100 may be supported by the lamp socket directly fixed to the bottom chassis. In one alternative exemplary embodiment may include a wire connected to the socket terminal of the lamp socket instead of the PCB 150 such that the electric power can be supplied to the fluorescent lamp through the wire. In another alternative exemplary embodiment, the lamp socket 200 and/or the PCB 150 may be fixed to another component of the receiving case such as the mold frame 34 instead of the bottom chassis 36.

Referring to FIGS. 3 to 6, the lamp socket 200 includes a socket housing 220, a supporting member 230 installed to one side of the socket housing 220 and supporting one end of the fluorescent lamp 100 and the socket terminal 240 coupled to the socket housing 220.

The socket housing 220 may be made of a resin for insulation from the bottom chassis 36. The socket housing 220 includes a seating portion 221 having an upper portion on which the supporting member 230 is seated and a lower portion to which one end of the socket terminal 240 is fixed and a terminal receiving portion 222 upwardly extending from one side of the seating portion 221 and formed with a terminal receiving space 223 in which a portion of the socket terminal 240 is accommodated.

A pair of (substrate) seating portions 224 are formed on both sides of the bottom of the socket housing 220 and are spaced apart from each other. Each of the substrate seating portions 224 protrudes in forward, rearward and lateral directions by a predetermined distance from the bottom of the socket housing 220. A bottom surface of the substrate seating portion 224 may be seated on the bottom chassis 36 and the PCB 150 can be seated on a top surface of the substrate seating portion 224. A through-hole may be formed in the PCB 150 through which the socket housing 220 may be inserted, such that the PCB 150 is seated on the top surface of the substrate seating portion 224. Alternative embodiments include configurations where the socket housing 220 is fixed when the socket terminal 240 (fixed to the socket housing) is soldered to the PCB 150. A substrate fastening hook 228 may be formed on a side surface of the socket housing 220 such that the socket housing 220 can be more tightly installed to the PCB 150. Since an edge of the through-hole of the PCB 150 may be positioned between the substrate fastening hook 228 and a top surface of the substrate seating portion 224, the socket housing 220 may be firmly fixed to the PCB 150 by means of the substrate fastening hook 228.

Referring to FIG. 3B, the socket terminal 240 includes a substrate connecting portion 241 attached to the PCB 150, such as by soldering, a horizontal extension portion 242 substantially horizontally extending from the substrate connecting portion 241, a pair of coupling portions 243 vertically extending respectively from two sides of one end of the horizontal extension portion 242 adjacent to the substrate connecting portion 241, a vertical extension portion 244 vertically extending from the other end of the horizontal extension portion 242 and formed with perpendicularly bent sides of an upper portion thereof and a pair of lead gripping portions 246 upwardly extending from the perpendicularly bent sides of the upper portion of the vertical extension portion 244 and being disposed opposing each other.

The lead gripping portions 246 may be bent several times at their tip ends such that lead coupling portions 247 can be formed between the tip ends. When the lead 122 of the fluorescent lamp 100 is inserted into the lead coupling portion 247 through an entrance of the lead coupling portion 247, i.e. the upper ends of the lead gripping portions 246, the lead gripping portions 246 are elastically deformed such that the lead 122 of the fluorescent lamp 100 can be fitted between the lead coupling portions 247.

In order to fix the socket terminal 240 into the socket housing 220, as shown in FIG. 5, a terminal fastening hook 243h is formed in the coupling portion 243 of the socket terminal 240 and a pair of terminal fixing slots 226 are formed between the substrate seating portions 224 on the bottom of the socket housing 220. The terminal coupling hook 243h may be formed by cutting an inner part of the coupling portion 243 and then bending the cut inner part to protrude further outward than a surface of the coupling portion 243, the coupling hook 243h being substantially in a downward direction. An entrance of the terminal fixing slot 226 has a width corresponding to a thickness of the coupling portion 243 and the interior thereof has a width larger than that of the entrance, so that a step is formed within the terminal fixing slot 226. Therefore, if the coupling portion 243 of the socket terminal 240 is inserted into the terminal fixing slot 226, the terminal coupling hook 243h is elastically deformed at the entrance of the terminal fixing slot 226 and then restored around and caught to an inner of the step of the terminal fixing slot 226. Accordingly, one end of the socket terminal 240 is fixed to the socket housing 220.

The configuration for fixing an end of the socket terminal 240 to the socket housing 220 is not limited thereto but can be modified in various manners. In one exemplary embodiment, after inserting the coupling portion 243 of the socket terminal 240 into a terminal fixing slot with a different shape formed in the lower end of the socket housing 220, a front end of the coupling portion 243 can be bent to fix the coupling portion 243 to the socket housing 220. In an alternative exemplary embodiment, if the substrate connecting portion 241 of the socket terminal 240 is merely soldered to the PCB 150, the socket terminal 240 can be fixed to the PCB 150 without using any coupling portion.

As described above, if the coupling portion 243 of the socket terminal 240 is inserted into the terminal fixing slot 226, the vertical extension portion 244 and the lead gripping portion 246 pass through the terminal receiving space 223 of the socket housing 220 such that the tip end of the lead gripping portion 246 is positioned at an upper end of the terminal receiving space 223.

Referring again to FIG. 3A, at a position corresponding to the upper end of the lead gripping portion 246, an opening 223a is formed in one side of the terminal receiving portion 222 of the socket housing 220 such that the lead 122 of the fluorescent lamp 100 is positioned within the terminal receiving space 223. Therefore, one end of the fluorescent lamp 100 may be positioned within the opening 223a and the lead 122 of the fluorescent lamp 100 may be fixed to the lead gripping portion 246 of the socket terminal 240. The vertical extension portion 244 and the lead gripping portion 246 of the socket terminal 240 are spaced apart by a predetermined distance from the inner wall of the terminal receiving space 223 of the socket housing 220. Since only the coupling portion 243 of the socket terminal 240 is fixed to the socket housing 220, the lead coupling portion 247 of the socket terminal 240 is installed resiliently in the terminal receiving space 223 of the socket housing 220.

In exemplary embodiments, an elastic gripping force of the lead gripping portion 246 gripping the lead 122 of the fluorescent lamp 100 is greater than an elastic force of the lead coupling portion 247 that resiliently moves in the terminal receiving space 223. A gripping force for gripping the lead 122 by the lead gripping portion 246 may be adjusted by suitably changing the thickness of the lead gripping portion 246, the shape of the lead coupling portion 247 formed by bending a front end of the lead gripping portion 246 and/or the like.

In other exemplary embodiments, a degree that the lead coupling portion 247 is resiliently moved may be adjusted by suitably changing the length and width of the horizontal extension portion 242 that extends from the substrate connecting portion 241 (which may be soldered and fixed to the PCB 150). The fluorescent lamp 100 is fixed for resilient movement in the terminal receiving space 223 together with the lead coupling portion 247 of the lead gripping portion 246 in a state where the lamp 100 is gripped by the lead gripping portion 246 to accommodate an external impact applied to the fluorescent lamp 100, reducing or essentially preventing damage to the lamp 100.

The supporting member 230 installed to the seating portion 221 of the socket housing 220 supports one end of the lamp tube 110 of the fluorescent lamp 100 when the lead 122 of the fluorescent lamp 100 is fixed to the lead gripping portion 246 of the socket terminal 240. The supporting member 230 may be made of a cushioning material such as a silicone resin, rubber and sponge. The supporting member 230 is brought into contact with the lamp tube 110 of the fluorescent lamp 100 and receives heat generated from the fluorescent lamp 100. In exemplary embodiments, the supporting member 230 is preferably heat resistant. In other exemplary embodiments, the supporting member 230 may be integrally formed with the socket housing 220 through a two-component injection molding technique or may be individually manufactured, then attached to the socket housing 220.

A tube seating groove 232 is formed on an upper surface of the supporting member 230 such that the supporting member 230 supports one end of the lamp tube 110. The tube seating groove 232 is formed on the upper surface of the supporting member 230 with a shape substantially corresponding to that of the lamp tube 110 of the fluorescent lamp 100 such that the lamp tube 110 can be seated on the upper surface of the supporting member 230.

In one exemplary embodiment, the tube seating groove 232 may be formed with an entrance at an upper end thereof to allow the lamp tube 110 to be introduced into the seating groove such that the size of the entrance is smaller than an outer diameter of the lamp tube 110, such that one end of the lamp tube 110 is not separated from but can be retained in the tube seating groove 232. When the lamp tube 110 is inserted and seated in the tube seating groove 232, portions of the tube seating groove 232 near the entrance of the tube seating groove 232 are elastically deformed and then restored to grip the lamp tube 110. In another exemplary embodiment, an inclined surface 232s may be formed at the entrance of the tube seating groove 232 such that the lamp tube 110 can be easily inserted into the tube seating groove 232.

In another exemplary embodiment, where the size of the entrance of the tube seating groove 232 is kept unchanged or constant, an inner diameter of the tube seating groove 232 may be set greater than the outer diameter of the lamp tube 110 such that the lamp tube 110 is not separated from but is resiliently movable within the tube seating groove 232. Here, the length of the supporting member 230 may be set not to grip an effective light emitting region of the fluorescent lamp 100.

In the illustrated embodiments of FIGS. 3-6, if the one end of the fluorescent lamp 100 is inserted into the lamp socket 200, the lead 122 of the fluorescent lamp 100 is fixed into the resiliently movable lead coupling portion 247 of the socket terminal 240 and the lamp tube 110 of the fluorescent lamp 100 is supported by the deformable supporting member 230 with a certain cushioning property. One end of the fluorescent lamp 100 is not fixedly but movably supported to the lamp socket 200 and simultaneously supported by the supporting member 230 with a predetermined cushioning function to thereby absorb external impact such that the damage of the lamp due to the external impact can be minimized. Advantageously, the lead 122 of the present invention is not bent by stress caused by an external impact since the stress is uniformly distributed and absorbed by the supporting member. At the same time, since the lead 122 of the fluorescent lamp 100 is gripped by the lead gripping portion 246 of the socket terminal 240 and one end of the lamp tube 110 is supported and retained by the supporting member 230, it is possible to reduce or essentially prevent the fluorescent lamp 100 being separated from the lamp socket 200 due to the external impact.

Additionally in the illustrated embodiments, the socket terminal 240 that grips the lead 122 of the fluorescent lamp 100 can be resiliently moved in all axial directions and the lamp tube 110 is supported and retained by the supporting member 230. Advantageously, a stable structure capable of decreasing stress and moment caused by the vibration and impact and thus reducing or effectively preventing the damage caused by the separation of the fluorescent lamp 100 can be obtained.

In exemplary embodiments, the supporting member 230 may be configured such as not to grip one end of the lamp tube 110 but to simply support the lamp tube 110, because the supporting member wraps around the lower and side surfaces of the lamp tube 110. To complement the supporting of the lamp tube 110, the lead 122 of the fluorescent lamp 100 is firmly gripped within the lead coupling portion 247 only by the lead gripping portion 246. Although the lamp socket 200 is configured to resiliently grip the lead 122 of the fluorescent lamp 100, the lead 122 of the fluorescent lamp 100 need not be resiliently gripped because the external impact is sufficiently absorbed by the supporting member 230.

Figure 7A:
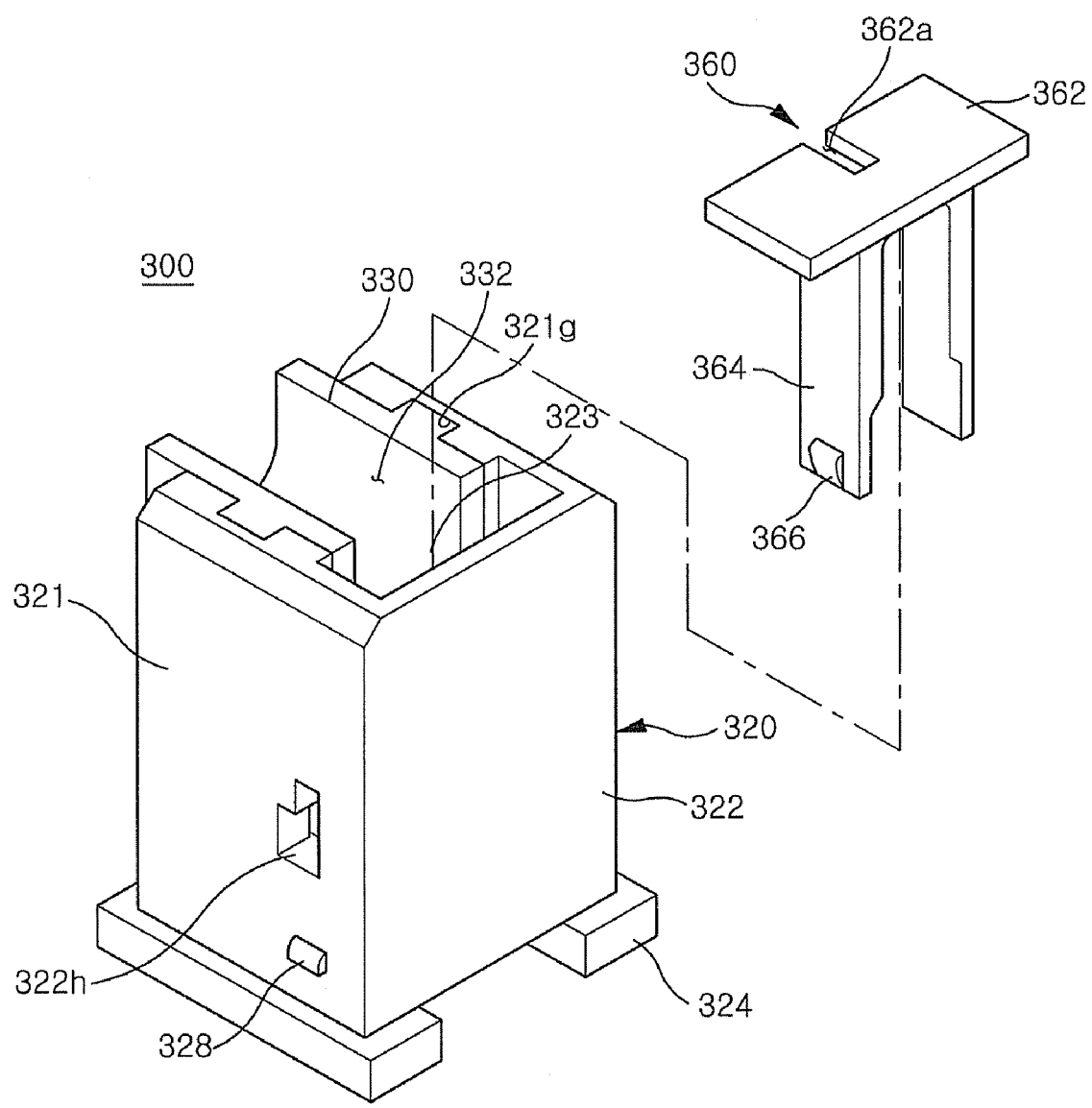
FIGS. 7A, 7B and 8 are exploded perspective views and a plan view showing another exemplary embodiment of a lamp socket corresponding to a lamp support unit according to the present invention, respectively.
Figure 7B:
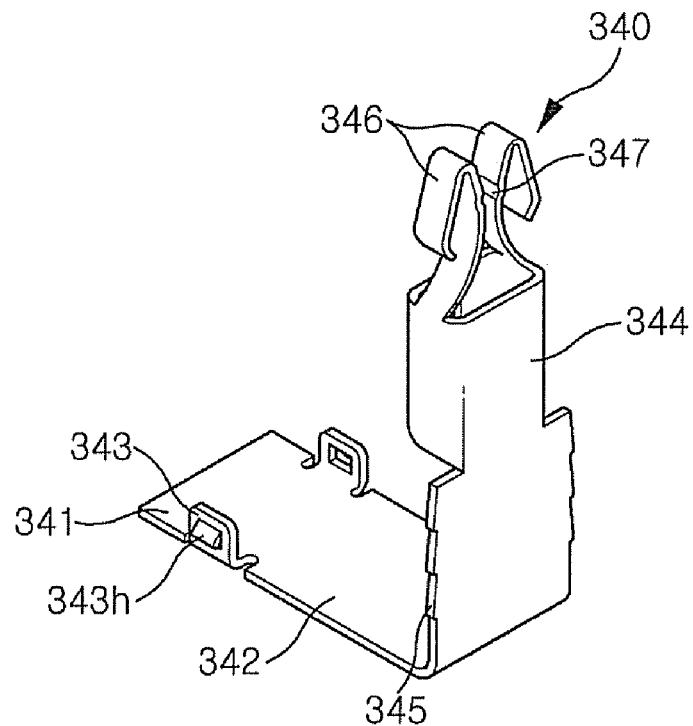
Figure 8:
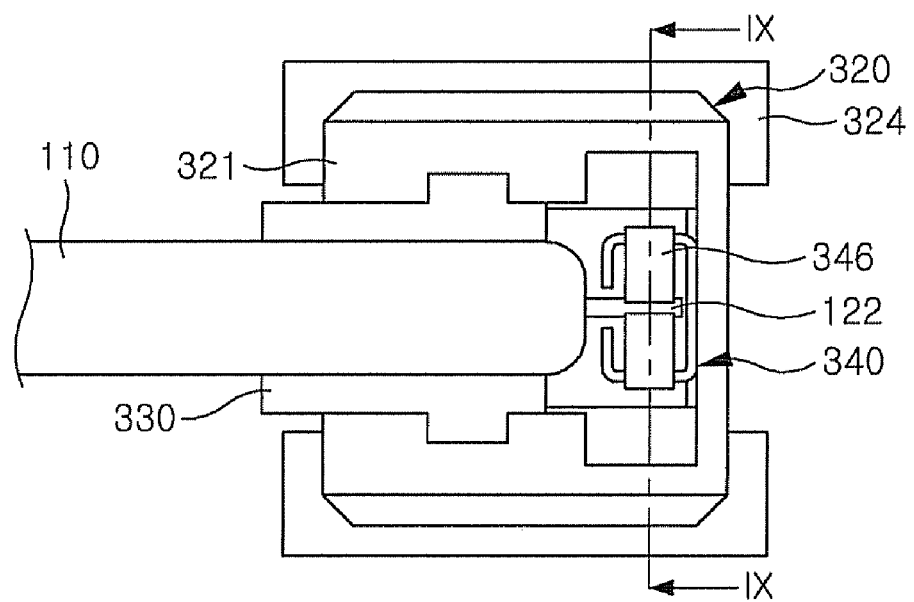
Figure 9:
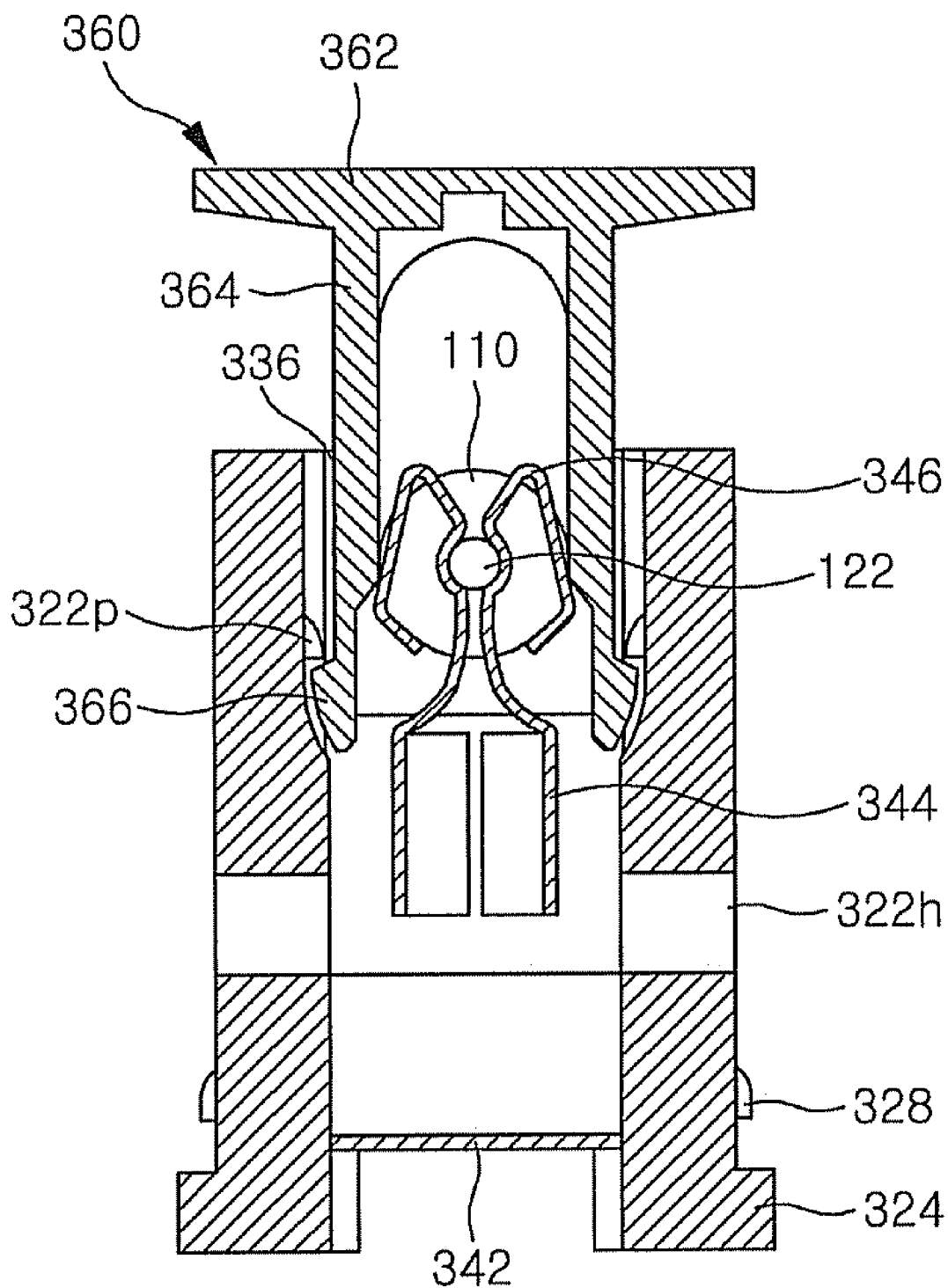
FIGS. 9 and 10 are cross-sectional views taken along line IX-IX of FIG. 8, respectively.
Figure 10:
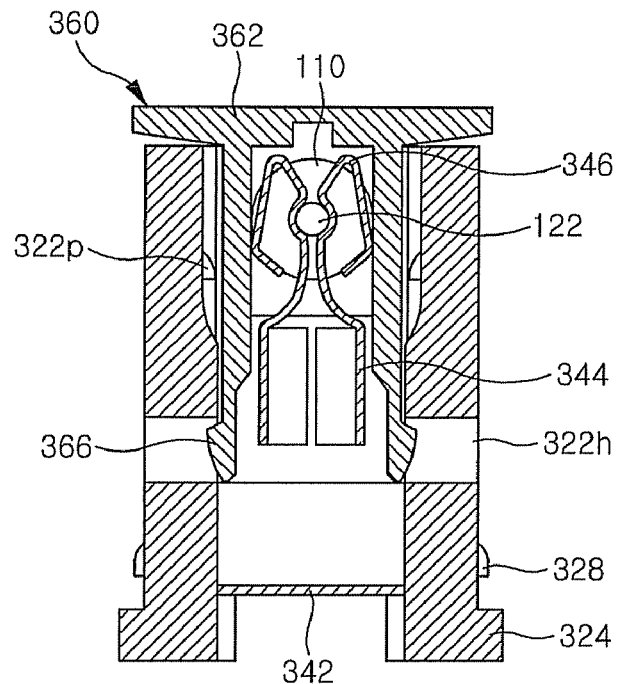

FIGS. 7A, 7B and 8 are exploded perspective and plan views of another exemplary embodiment of a lamp socket serving as a lamp support unit in the present invention, respectively, and FIGS. 9 and 10 are cross-sectional views taken along line IX-IX of FIG. 8.

Referring to FIGS. 7 to 10, a lamp socket 300 includes a socket housing 320, a supporting member 330 installed to one side of the socket housing 320 to support one end of the fluorescent lamp 100, a socket terminal 340 coupled to the socket housing 320 and a fastening cover 360 coupled to the top of the socket housing 320 to fix the lead 122 of the fluorescent lamp 100 to the socket terminal 340.

The socket housing 320 includes a seating portion 321 having an upper portion to which the supporting member 330 is placed and a lower portion to which a part of the socket terminal 340 is positioned, a terminal receiving portion 322 formed with a vertically penetrated terminal receiving space 323 and a substrate seating portion 324 on which the PCB 150 is seated. A substrate fastening hook 328 may be formed on a side surface of the socket housing 320 such that the socket housing 320 can be more tightly installed to the PCB 150. The configuration of the substrate seating portion 324 and the method of fixing the socket housing 320 to the PCB 150 are the same as that referring to FIGS. 3-6, and thus, the detailed descriptions thereof will be omitted herein. Further, the detailed descriptions on the same configurations and functions as the previously described will be omitted herein.

The socket terminal 340 includes a substrate connecting portion 341 connected to the PCB 150, such as by soldering, a horizontal extension portion 342 horizontally extending from the substrate connecting portion 341, a vertical extension portion 344 vertically extending from one end of the horizontal extension portion 342 and formed with perpendicularly bent (opposing) sides of an upper portion thereof and a pair of opposite lead gripping portions 346 upwardly extending from the perpendicularly bent sides of the upper portion of the vertical extension portion 344. Each of the lead gripping portions 346 is composed of inner and outer bent portions. Lead coupling portion 347 is formed between the inner bent portions while the outer portions face an inner wall of the terminal receiving space 323.

In order to fix the socket terminal 340 into the socket housing 320, the socket terminal 340 includes terminal fastening hooks 343h formed on fastening portions 343 extending upwardly from both sides of the horizontal extension portion 342 and fixing protrusions 345 formed on both sides of the vertical extension 344 in the form of tooth or wedge. In addition, a terminal fixing slot (not shown) may be formed in the socket housing 320 The terminal receiving space 323 into which the horizontal extension portion 342 is inserted may have a width corresponding to a width of the vertical extension portion 344 on which the fixing protrusions 345 are formed. The coupling between the terminal fastening hooks 343h of the coupling portions 343 and the terminal fixing slots is substantially the same as that described in the illustrated embodiments of FIGS. 3-6.

When the vertical extension portion 344 is fit into the terminal receiving space 323, the inner wall of the terminal receiving space 323 is partially deformed to be fastened to the fixing protrusion 345 (see FIGS. 9 and 10). A largest width of the vertical extension portion 344 (taken in a direction substantially parallel to a closed side of the terminal receiving portion 322) is substantially the same or slightly larger than the width of the inner wall of the terminal receiving space 323. At this time, if the fixing protrusions 345 are formed to have an inclined side whose width is increased in a downward direction as shown in FIG. 7, the vertical extension portion 344 is relatively easily inserted into the terminal receiving space 323 but not separated from the terminal receiving space 323. The configuration for fixing the socket terminal 340 to the socket housing 320 is not limited thereto and can be modified in various ways.

As the socket terminal 340 is fixed into the socket housing 320, an upper end of the lead gripping portion 346 passes through the terminal receiving space 323 of the socket housing 320 and reaches an uppermost position in the terminal receiving space 323.

An entrance is formed in one side of the terminal receiving portion 322 of the socket housing 320 corresponding to the upper end of the lead gripping portion 346 such that the lead 122 of the fluorescent lamp 100 can be placed within the terminal receiving space 323. One end of the fluorescent lamp 100 is positioned in the entrance and the lead 122 of the fluorescent lamp 100 can be fixed to the lead gripping portion 346 of the socket terminal 340. Motion of the vertical extension portion 344 within the terminal receiving space 323 of the socket housing 320 is limited, contrary to the illustrated embodiments of FIGS. 3-6 in which the vertical extension portion is resiliently moved within the terminal receiving space. The vertical extension portion 344 is fixed in the terminal receiving space 323 with the fixing protrusions 345 formed on both sides thereof, as mentioned above.

The fastening cover 360 may be employed as a fastening member to more firmly fixing the lead 122 of the fluorescent lamp 100 to the lead gripping portion 346 of the socket terminal 340. The fastening cover 360 includes a cover plate 362 formed with an opening 362a at one side to allow the lead 122 of the fluorescent lamp 100 to pass through the opening 362a and two terminal pressing plates 364 extending downwardly from the cover plate 362. The terminal pressing plates 364 are constructed in such a manner that a distance between their lower inner surfaces is wider than a distance between their upper inner surfaces. A cover fastening hook 366 is formed on an outer surface 336 of each terminal pressing plate 364 to fix the terminal pressing plate into the terminal receiving space 323. In connection with the cover fastening hook 366, a cover fixing protrusion 322p caught to the cover fastening hook 366 and a cover fixing hole 322h formed below the protrusion 322p are formed in the inner sidewall of the terminal receiving space 323.

If the fastening cover 360 is inserted into the uppermost position of the terminal receiving space 323 and the cover fastening hook 366 is then fastened to the cover fixing protrusion 322p, an outer side of the lead gripping portion 346 is positioned between the lower inner surfaces of the terminal pressing plates 364 as shown in FIG. 9. The lead 122 of the fluorescent lamp 100 is seated in the lead coupling portion 347 through the opening 362a formed at one side of the cover plate 362.

Then, if the fastening cover 360 is pushed further downward in FIG. 9 and completely inserted into the terminal receiving space 323, the cover fastening hook 366 is caught and fastened to the cover fixing hole 322h and the outer side of the lead gripping portion 346 is simultaneously positioned between the upper inner surfaces of the terminal pressing plates 364. Since the distance between the upper inner surfaces of the terminal pressing plates 364 is formed smaller than the distance between the lower inner surfaces, the upper inner surfaces of the terminal pressing plates 364 press the lead gripping portion 346 to thereby more firmly grip the lead 122 of the fluorescent lamp 100 positioned in the lead coupling portion 347 between the opposite terminal pressing plates 364.

A fastening member which is fastened to the socket housing 320 to allow the lead coupling portion 347 of the lead gripping portion 346 to firmly grip the lead 122 of the fluorescent lamp 100 is not limited to the aforementioned fastening cover 360 but may be modified in various ways.

In exemplary embodiments, an upper portion of the seating portion 321 may have a flat upper surface as described in the illustrated embodiments of FIGS. 3-6. As shown in FIG. 7, right and left sidewalls may be further formed to surround a lower side and both right and left sides of one end of the lamp tube 110. The supporting member 330 for supporting the end of the fluorescent lamp 100 is formed in the right and left sidewalls. A tube seating groove 332 is formed in the interior of the supporting member 330 such that the end of the lamp tube 110 is supported when the lead 122 of the fluorescent lamp 100 is fixed into the lead gripping portion 346 of the socket terminal 340. The supporting member 330 may be made of a certain cushioning material such as a silicone resin, rubber and/or sponge. The supporting member 330 in brought into contact with the lamp tube 110 of the fluorescent lamp 100 and receives heat generated from the fluorescent lamp 100. The supporting member is preferably heat resistant. The supporting member 330 may be either integrally formed with the socket housing 320, such as by a two-component injection molding technique, or individually prepared and attached to the seating portion 321.

Coupling grooves 321g are formed in the right and left sidewalls of the seating portion 321 and corresponding protrusions (not shown) are formed on the supporting member 330. Since a contact area is increased when the supporting member 330 is attached to the socket housing 320, a coupling force between the supporting member 330 and the socket housing 320 can be improved.

The tube seating groove 332 of the supporting member 330 may be formed to be completely open upward and to support the lamp tube 110 while being contact with the lower side and the right and left sides of the lamp tube 110. The lead 122 of the fluorescent lamp 100 can be firmly gripped as illustrated in FIGS. 8-10 as compared with the illustrated embodiments of FIGS. 3-6 such that the supporting member 330 can absorb external impact while merely supporting the lamp tube 110 without gripping the lamp tube 110. A predetermined gap may exist between the tube seating groove 332 of the supporting member 330 and the lamp tube 110.

The supporting member 330 may extend in a longitudinal direction of the fluorescent lamp 100 and protrude outward from the socket housing 320 in order to improve impact absorbing performance. In one exemplary embodiment, the length of the supporting member 330 is set such that the supporting member 330 does not extend to an effective light emitting region of the fluorescent lamp 100.

If one end of the fluorescent lamp 100 is inserted into the lamp socket 300, the lead 122 of the fluorescent lamp 100 is firmly fixed to the lead gripping portion 346 of the socket terminal 340 and the one end of the lamp tube 110 is supported by the deformable supporting member 330 with a predetermined cushioning function. The external impact applied to the fluorescent lamp 100 may not be concentrated only to the lead 122 of the fluorescent lamp 100 but uniformly distributed to and absorbed by the supporting member 330 that supports the one end of the lamp tube 110. Stress caused by the external impact is distributed by means of the lamp socket and absorbed into the supporting member to thereby reduce or effectively prevent the lead 122 from being bent or fine cracks from being generated between the lamp tube 110 and the lead 122. Additionally, since the supporting member 330 may be integrally formed with the socket housing 320 through the two-component injection molding technique, it is possible to improve productivity and quality of product and thus to reduce costs of products.

In exemplary embodiments, the supporting member 330 is made of a certain cushioning material and supports the lamp tube 110 of the fluorescent lamp 100 in a state where the lamp tube is seated thereon. On the other hand, if the lamp tube 110 is gripped by the supporting member, the stress caused by the external impact concentrated on the socket terminal can be distributed by the supporting member.

Figure 11:
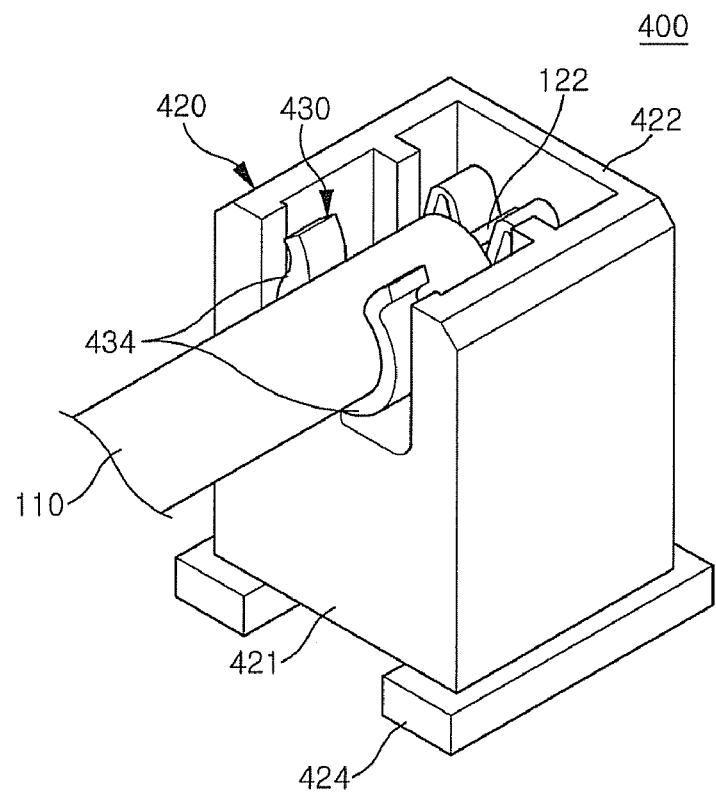
FIGS. 11 and 12 are a perspective view and a front view showing a lamp socket corresponding to another exemplary embodiment of a lamp support unit according to the present invention, respectively.
Figure 12:
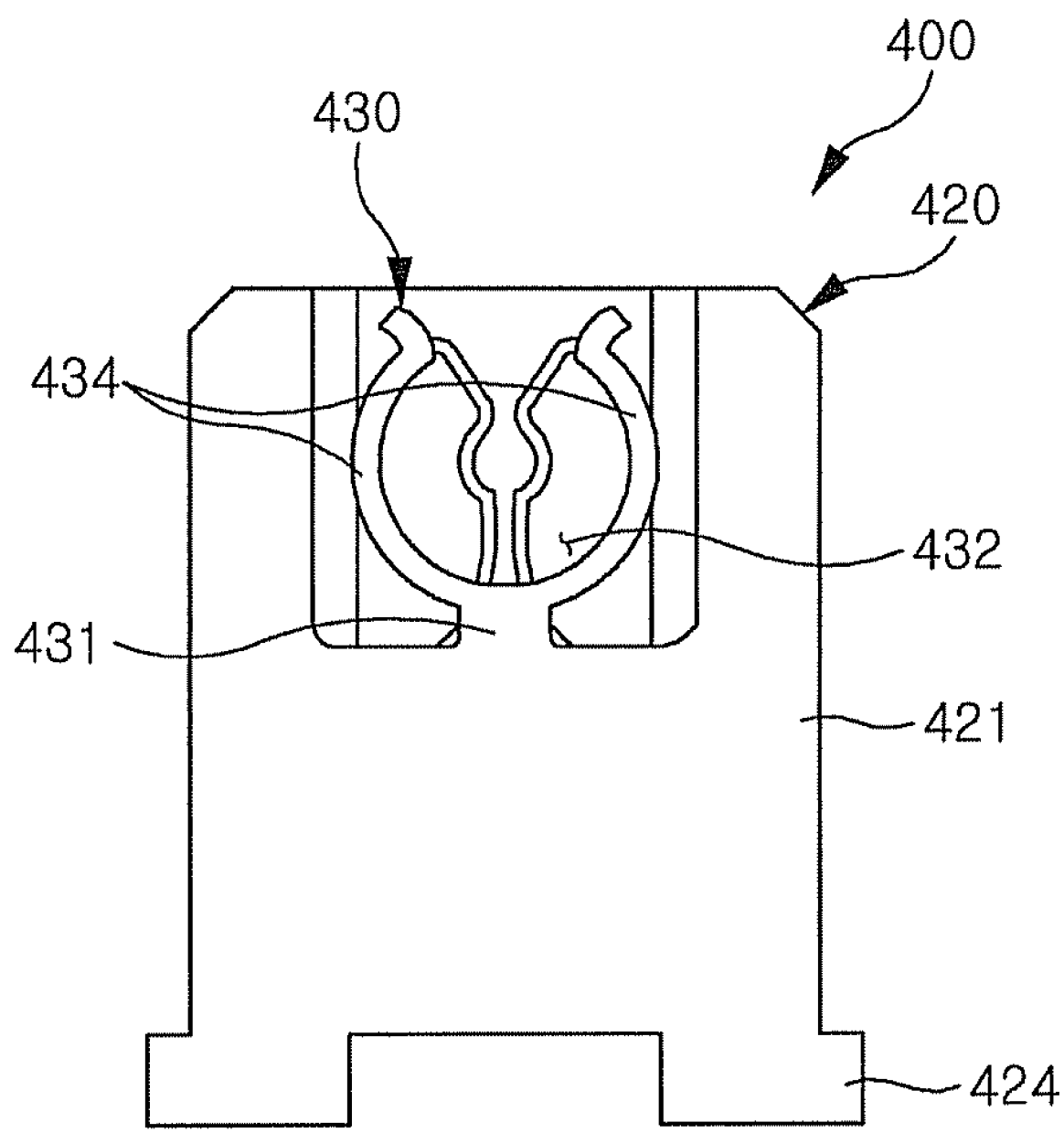

Referring to FIGS. 11 and 12, a lamp socket 400 is substantially the same as the lamp socket 300 of FIGS. 7-10, except the material and shape of the supporting member. Thus, exemplary embodiments of a supporting member 430 of the lamp socket 400 will be hereinafter described with reference to FIGS. 11 and 12 showing perspective and front views of the lamp socket 400 according to the present invention.

The socket housing 420 includes a terminal receiving portion 422 formed with a vertically penetrated terminal receiving space and a seating portion 424.

The supporting member 430 includes a connecting portion 431 formed generally at the center of an upper surface of a seating portion 421 and a pair of gripping arms 434 extending upward from the connecting portion 431 in right and left directions to be formed into a clip shape surrounding a part of the outer circumference of the lamp tube 110. A tube seating groove 432 in which the lamp tube 110 is seated is formed in the gripping arms 434. A distance between the tip ends of the gripping arms 434 defining an entrance of the tube seating groove 432 is formed smaller than the outer diameter of the lamp tube 110. When the lamp tube 110 is inserted into the tube seating groove 432 between the gripping arms 434, the tip ends of the gripping arms 434 are elastically deformed and then restored to grip the lamp tube 110. In one exemplary embodiment, the pair of gripping arms 434 that grip the lamp tube 110 have a gripping force of about 0.8 kgf or above. In another exemplary embodiment, the pair of gripping arms 434 that grip the lamp tube 110 have a gripping force of about 1.0 kgf to 2.0 kgf.

The supporting member 430 may be made of the same material as the socket housing 420. Material for the supporting member 430 and/or the socket housing 420 may include, but is not limited to, a resin. In exemplary embodiments, the supporting member 430 may be either integrally formed with the socket housing 420, such as during the manufacturing, such as by injection molding, of the socket housing or individually manufactured and then attached to the seating portion 421 of the socket housing 420. An upper portion of the seating portion 421 on which the supporting member 430 is formed is formed with right and left sidewalls to surround right and left sides of the supporting member 430 as shown in FIGS. 11 and 12. However, the present invention is not limited thereto, but the seating portion may be formed with a flat upper surface.

In the lamp socket 400 having the supporting member 430, the supporting member 430 grips the lamp tube 110 while the socket terminal firmly grips the lead 122 of the fluorescent lamp 100 in substantially the same way as the illustrated embodiments of FIGS. 7-10. Stress caused by the external impact is distributed to the lead 122 of the fluorescent lamp 100 and the lamp tube 110 to thereby prevent the lead from being bent or fine cracks from being generated between the lamp tube 110 and the lead 122.

In other exemplary embodiments, if the length and/or thickness of the connecting portion 431 of the supporting member 430 are adjusted, a certain degree of elasticity may be provided to the supporting member 430 and the supporting member 430 can perform a shock-absorbing function against the external impact. Furthermore, the shape of the supporting member 430 is not limited to that illustrated in the figures. That is, the supporting member 430 may be changed into various shapes so long as they can grip the lamp tube 110.

Figure 13:
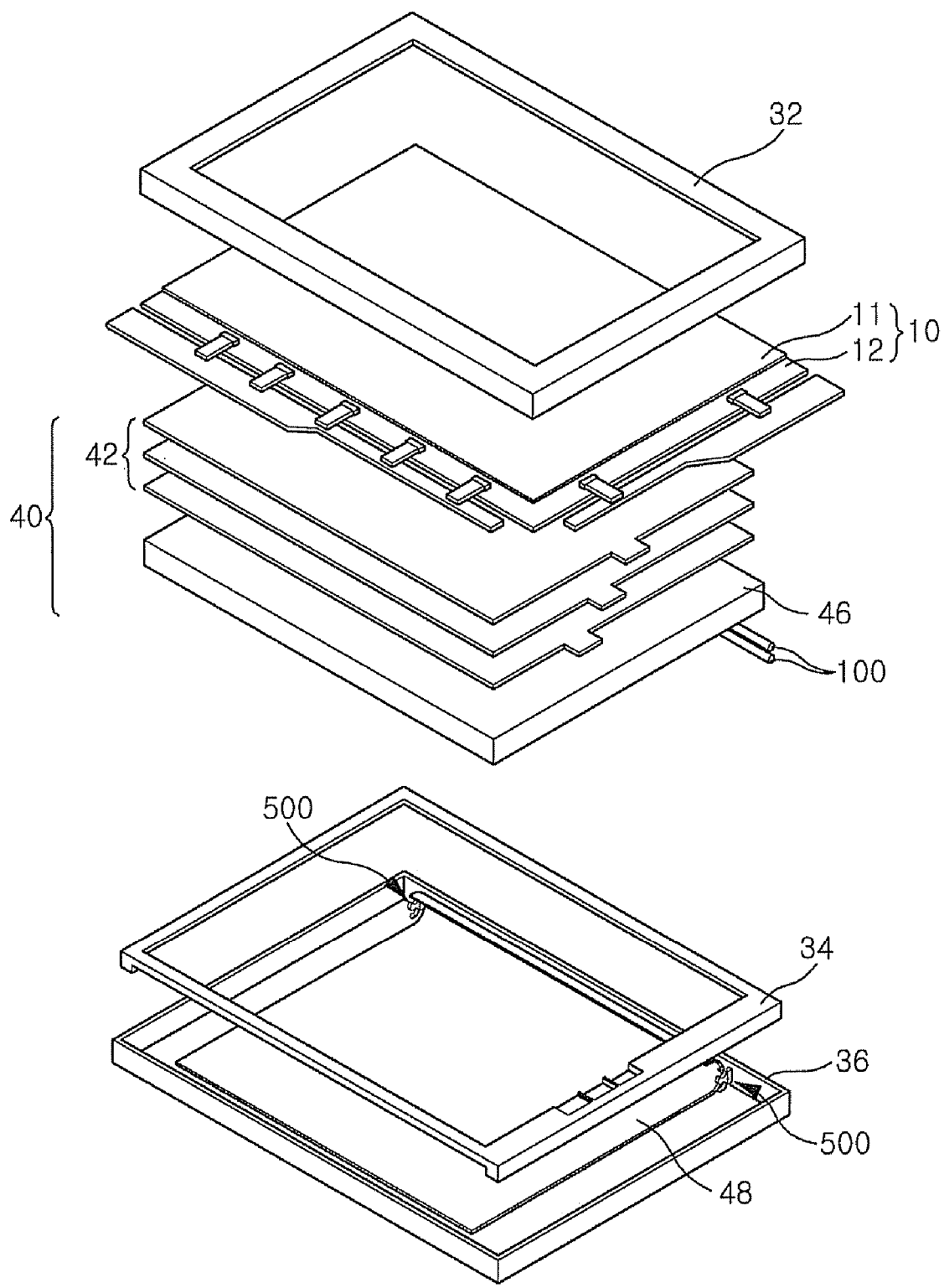
FIG. 13 is a schematic exploded perspective view showing another exemplary embodiment of a liquid crystal display to which a lamp support unit is applied according to the present invention.
Figure 14:
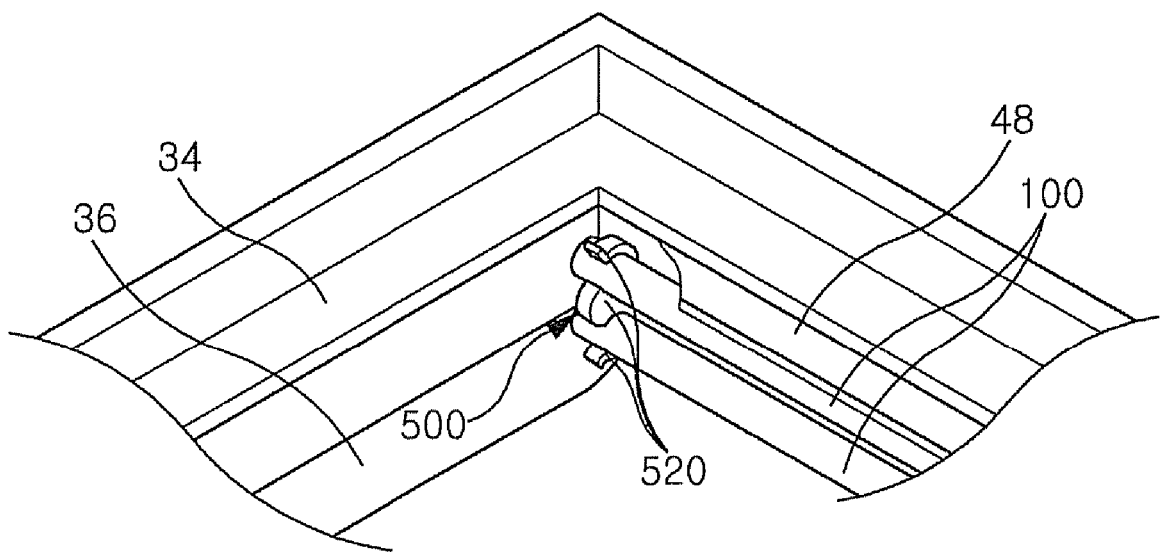
FIGS. 14A and 14B are an enlarged view and a perspective view showing an exemplary embodiment of a state where a fluorescent lamp is mounted to the lamp support unit according to the present invention.
Figure 14A:
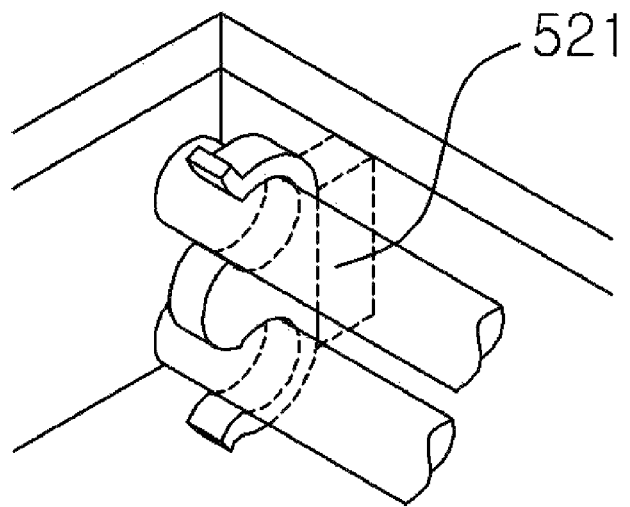
Figure 14B:
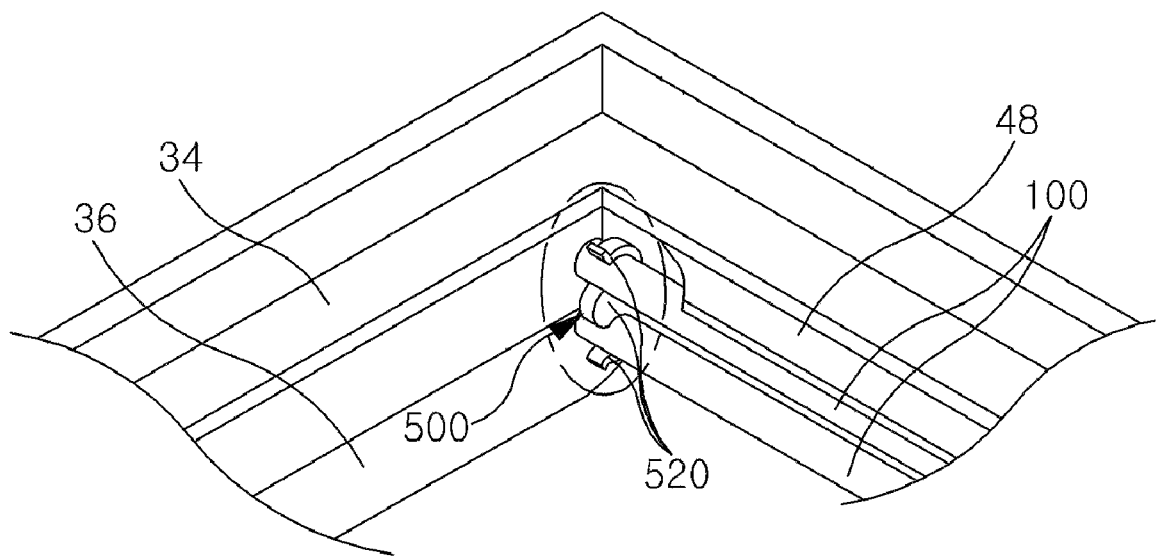

FIG. 13 is a schematic exploded perspective view of another exemplary embodiment of a liquid crystal display (LCD) to which an edge type backlight assembly is applied and FIGS. 14A and 14B are an enlarged view and a perspective view showing an exemplary embodiment of a state where a fluorescent lamp is mounted to the lamp support unit.

Referring first to FIG. 13, the LCD to which the edge type backlight assembly is applied comprises an LCD panel 10 including a color filter substrate 11 and a thin film transistor substrate 12, a backlight assembly 40 providing light to the LCD panel 10 and a receiving case including a top chassis 32, a mold frame 34 and a bottom chassis 36 supporting and protecting the LCD panel 10 and the backlight assembly 40.

The backlight assembly 40 disposed below the LCD panel 10 includes a light guide plate 46 converting light incident from a side into vertical plane light, a fluorescent lamp 100 installed to one side of the light guide plate 46 and irradiating light to one side of the light guide plate 46, a plurality of optical sheets 42 disposed between the light guide plate 46 and the LCD panel 10 and forming the light into a desired shape and a reflective plate 48 disposed below the light guide plate 46 and reflecting downwardly leaked light from the light guide plate 46 in an upward direction.

The fluorescent lamp 100 is installed to one side or to opposite sides of the light guide plate 46 according to a size of the LCD. In exemplary embodiments, one or at least two fluorescent lamps may be installed to each side in parallel with each other.

The lead 122 of the fluorescent lamp 100 is directly connected to a wire, such as through a soldering process. In order to fix one end of the fluorescent lamp 100, a lamp support unit 500 is fixed to one side of the bottom chassis 36 to which the fluorescent lamp 100 is positioned. The side of the bottom chassis 36 to which the lamp support unit 500 is fixed, extends from a bottom portion of the bottom chassis 36, such as being extended substantially perpendicular to the bottom portion of the bottom chassis 36 as illustrated in FIGS. 13, 14A and 14B. At this time, the lamp support unit 500 may be attached to the bottom chassis 36, such as by using an adhesive or the lamp support unit 500 may be fixed to the bottom chassis in an interference fit, such as by additionally boring a fastening hole into the bottom chassis 36 to which the lamp support unit 500 is fixed. In other exemplary embodiments, the lamp support unit 500 may be fixed to other components of the receiving case such as the mold frame 34, other than the bottom chassis 36, according to the inner structure of the LCD.

The lamp support unit 500 may include a grip member, such as in the shape of a clip, to grip the lamp tube 110. The lamp support unit may include the grip member to secure a single lamp. In other exemplary embodiments, the lamp support unit may include multiple grip members, such as a connecting portion 521 fixed to one side of the bottom chassis 36 and three gripping arms 520 (FIGS. 14A and 14B.) branched off from the connecting portion to surround a part of the outer circumference of the lamp tube 110. The central one of the gripping arms 520 serves to commonly support both sides of the upper and lower fluorescent lamps 100 and keep a distance between the two fluorescent lamps 100. In an alternative exemplary embodiment, the lamp support unit 500 may have several pairs of gripping arms 520, each of which supports the fluorescent lamp 100, without commonly supporting the upper and lower fluorescent lamps 100.

The lamp support unit 500 may include a grip member, such as in the shape of a clip, to grip the lamp tube 110. The lamp support unit may include the grip member to secure a single lamp. In other exemplary embodiments, the lamp support unit may include multiple grip members, such as a connecting portion (not shown) fixed to one side of the bottom chassis 36 and three gripping arms 520 (FIG. 14.) branched off from the connecting portion to surround a part of the outer circumference of the lamp tube 110. The central one of the gripping arms 520 serves to commonly support both sides of the upper and lower fluorescent lamps 100 and keep a distance between the two fluorescent lamps 100. In an alternative exemplary embodiment, the lamp support unit 500 may have several pairs of gripping arms 520, each of which supports the fluorescent lamp 100, without commonly supporting the upper and lower fluorescent lamps 100.

A tube seating groove in which the lamp tube 110 is seated is formed between the adjacent gripping arms 520. A distance between the tip ends of the gripping arms 520 defining an entrance of the tube seating groove is formed relatively smaller than the outer diameter of the lamp tube 110. When the lamp tube 110 is inserted into the tube seating groove of the gripping arms 520, the tip ends of the gripping arms 520 are elastically deformed and then restored to grip the lamp tube 110. Since the lamp support unit 500 should grip the lamp tube 110 with a suitable gripping force and be insulated from the bottom chassis 36, it is preferably formed of a resin. The lamp support unit 500 receives heat generated from the fluorescent lamp 100 because it grips the lamp tube 110. The lamp support unit 500 is preferably heat resistant.

In exemplary embodiments, the fluorescent lamp 100 may be inserted between and fixed to the gripping arms 520 in a state where the lead 122 is connected to a wire through a soldering process. Advantageously, it is possible to fix the fluorescent lamp 100 more easily than when using a conventional lamp holder.

In another exemplary embodiment, if the clip-shaped lamp support unit 500 is used instead of a lamp holder, a lamp cover for fixing the lamp holder may be eliminated. Since both the lamp cover and the lamp holder can be eliminated, an air layer is formed between an end of the fluorescent lamp 100 and the mold frame 34 on which the LCD panel 10 is seated. This air layer prevents heat generated in the fluorescent lamp 100 from being transferred directly to the LCD panel 10 and allows the heat to be released to the outside through the bottom chassis 36, so that the heat dissipation effect can be improved. Since the brightness of the fluorescent lamp 100 is generally inversely proportional to the increase in temperature, the lamp support unit 500 can be used to improve the brightness of the backlight assembly 40 to which the lamp support unit is applied.

Since the lamp cover may be eliminated by using the lamp support unit 500, other components for directing the light generated in the fluorescent lamp 100 toward the light guide plate 46 may be necessary. In one exemplary embodiment, the reflective plate 48 disposed below the light guide plate 46 extends to surround the fluorescent lamp 100 as shown in FIG. 13. The reflective plate 48 has a substantially similar width as a distance between the lamp support units 500 installed at both ends of the fluorescent lamp 100 to surround the fluorescent lamp 100 and also extends near an upper edge of the light guide plate 46.

In one exemplary embodiment, the lamp support unit allows one end of the fluorescent lamp fixed to the lamp socket to be supported by both the lead and the lamp tube. It is possible to distribute stress caused by external impact and prevent the lead of the fluorescent lamp from being bent. Since a gripping force of the fluorescent lamp is improved, it is possible to protect or essentially prevent the fluorescent lamp from being separated from its proper position. A distance between the adjacent fluorescent lamps is kept unchanged, and thus, uniform brightness can also be obtained. If the lead of the fluorescent lamp is protected from being bent, it may be possible to prevent fine cracks from being generated between the lead and the lamp tube of the fluorescent lamp. Advantageously, the life of the fluorescent lamp can be prolonged.

In another exemplary embodiment, since the lamp tube of the fluorescent lamp is supported by the supporting member with a predetermined cushioning property or elasticity, external impact can be more effectively absorbed. This shock absorbing effect can solve the aforementioned problems regarding the separation of the fluorescent lamp, the bending of the lead, and the like.

In another exemplary embodiment, in a case where the lamp support unit of the present invention is applied to an edge type backlight assembly, the fluorescent lamp can be more easily fixed as compared with a conventional lamp holder. A time taken to perform an assembling process can be shortened. A lamp cover for fixing the lamp holder may not be needed and a number of parts used can be reduced. If the lamp cover and the lamp holder are eliminated, an air layer can be formed between the mold frame and the fluorescent lamp. As a result, it may be possible to prevent heat from being transferred directly to the LCD panel and thus improve heat dissipation effect through the bottom chassis. Advantageously, the brightness of the backlight assembly can be improved.

Although the present invention has been described in connection with the exemplary embodiments illustrated in the accompanying drawings, it will be understood by those skilled in the art that various changes and modifications can be made thereto without departing from the scope and spirit of the present invention defined in the appended claims.

Although it has been described in the aforementioned embodiments that a fluorescent lamp is used as a light source, the present invention is not limited thereto. That is, other kinds of lamps may be applied to the present invention. In one exemplary embodiment, when an ultraviolet lamp is used in a state where a fluorescent film is formed on an optical sheet, the lamp support unit of the present invention may be used to fix the ultraviolet lamp.

What is claimed is:

1. A lamp support unit, comprising:
   a connecting portion fixed to a side portion of a receiving case of a liquid crystal display, the side portion extending in a first direction from a bottom portion of the receiving case, the first direction being a perpendicular direction to the bottom portion of the receiving case; and
   a clip-shaped gripping arm extending from the connecting portion forming a tube seating groove that surrounds a part of an outer circumference of a lamp tube, such that when the lamp tube is inserted into the tube seating groove, tip ends of the clip-shaped gripping arm are elastically deformed and then restored to fix the lamp tube,
   wherein a plurality of tube seating grooves are arranged in parallel with one another, and disposed adjacent to each other in the first direction.

2. The lamp support unit as claimed in claim 1, wherein the lamp support unit is made of a resin.

3. A backlight assembly, comprising:
   a light guide plate;
   a lamp disposed at one side of the light guide plate; and
   a lamp support unit supporting at least one end of the lamp, wherein the lamp support unit comprises:

a connecting portion fixed to a side portion of a receiving case of a liquid crystal display, the side portion extending in a first direction from a bottom portion of the receiving case, the first direction being a perpendicular direction to the bottom portion of the receiving case; and a clip-shaped gripping arm extending from the connecting portion and forming a tube seating groove that surrounds a part of an outer circumference of a lamp tube, such that when the lamp is inserted into the tube seating groove, tip ends of the clip-shaped gripping arm are elastically deformed and then restored to fix the lamp, wherein only a portion of an outer surface of the clip-shaped gripping arm contacts the connecting portion, and wherein a plurality of tube seating grooves are arranged in parallel with one another, and disposed adjacent to each other in the first direction.

4. The backlight assembly as claimed in claim 3, further comprising a continuous reflective plate disposed below the light guide plate and extending up to an upper edge of the light guide plate to surround a part of the lamp.

5. A liquid crystal display, comprising:
a liquid crystal display panel;
a backlight assembly comprising:
  a light guide plate installed below the liquid crystal display panel; and
  a lamp support unit fixing a lamp to one side of the light guide plate; and
a receiving case accommodating the liquid crystal display panel and the backlight assembly, and including a side portion extending in a first direction from a bottom portion of the receiving case, the first direction being a perpendicular direction to the bottom portion of the receiving case,
wherein the lamp support unit comprises:
  a connecting portion fixed to the side portion of the receiving case of the liquid crystal display; and
  a clip-shaped gripping arm extending from the connecting portion and forming a tube seating groove that surrounds a part of an outer circumference of a lamp tube, such that when the lamp is inserted into the tube seating groove, tip ends of the clip-shaped gripping arm are elastically deformed and then restored to fix the lamp,
  wherein only a portion of an outer surface of the clip-shaped gripping arm contacts the connecting portion, and
  wherein a plurality of tube seating grooves are arranged in parallel with one another, and disposed adjacent to each other in the first direction.

6. The liquid crystal display as claimed in claim 5, wherein the connecting portion is fixed to a bottom chassis of the receiving case.

7. The liquid crystal display as claimed in claim 5, further comprising a continuous reflective plate disposed below the light guide plate and extending up to an upper edge of the light guide plate and surrounding a part of the lamp.

8. A lamp support unit, comprising:
a socket housing comprising a terminal receiving portion including a terminal receiving space;
a socket terminal disposed in the terminal receiving space of the socket housing and gripping a lead of a lamp, the socket terminal comprising:
  a first portion extending substantially parallel with a longitudinal direction of the lamp, and
  a second portion continuous with the first portion, and extending substantially perpendicular to the first portion and the longitudinal direction of the lamp, the second portion gripping the lead of the lamp,
  wherein the second portion of the socket terminal is disposed spaced apart from inner walls of the terminal receiving portion; and
a supporting member made of resin and installed to the socket housing supporting a lamp tube of the lamp, the supporting member forming a single unit with the socket housing, wherein the supporting member comprises a tube seating groove in which the lamp tube is inserted, and an entrance of the tube seating groove through which the lamp is inserted is sized smaller than an outer diameter of the lamp tube.

9. The lamp support unit as claimed in claim 8, wherein the tube seating groove has an inner diameter greater than the outer diameter of the lamp tube.

10. The lamp support unit as claimed in claim 8, wherein the socket terminal comprises a lead coupling portion gripping the lead and mounted resiliently movable with respect to the socket housing.

11. The lamp support unit as claimed in claim 10, wherein the first portion of the socket terminal is fixed to the socket housing.

12. The lamp support unit as claimed in claim 10, wherein a base end of the socket terminal is fixed to a printed circuit board electrically connected to the socket terminal.

13. The lamp support unit as claimed in claim 8, wherein the supporting member further comprises a connecting portion connected to the socket housing and gripping arms extending from the connecting portion in right and left directions and forming the tube seating groove surrounding a part of an outer circumference of the lamp tube.

14. The lamp support unit as claimed in claim 13, wherein the socket terminal comprises a lead coupling portion gripping the lead and the lead coupling portion is fixed to the socket housing.

15. The lamp support unit as claimed in claim 13, wherein the connecting portion is elastic.

16. The lamp support unit as claimed in claim 8, wherein the socket housing and the supporting member are formed through a two-component injection molding technique.

17. The lamp support unit as claimed in claim 8, wherein the socket housing comprises a coupling groove and the supporting member further comprises a protrusion corresponding to the coupling groove.

18. The lamp support unit as claimed in claim 8, wherein an entrance of the supporting member is sized to be equal to or greater than an outer diameter of the lamp tube.

19. The lamp support unit as claimed in claim 18, wherein the socket terminal comprises a lead coupling portion gripping the lead and fixed to the socket housing.

20. The lamp support unit as claimed in claim 18, wherein the tube seating groove has an inner diameter greater than the outer diameter of the lamp tube.

21. A backlight assembly, comprising:
a lamp; and
a lamp support unit supporting at least one end of the lamp, wherein the lamp support unit comprises
  a socket housing comprising a terminal receiving portion including a terminal receiving space,
  a socket terminal disposed in the terminal receiving space of the socket housing and gripping a lead of the lamp, the socket terminal comprising:
    a first portion extending substantially parallel with a longitudinal direction of the lamp, and a second portion continuous with the first portion, and extending substantially perpendicular to the first portion and the longitudinal direction of the lamp, the second portion gripping the lead of the lamp,
wherein the second portion of the socket terminal is disposed spaced apart from inner walls of the terminal receiving portion, and
a supporting member made of resin and installed to the socket housing and supporting a lamp tube of the lamp, the supporting member forming a single unit with the socket housing,
wherein the supporting member comprises a tube seating groove in which the lamp tube is inserted, and an entrance of the tube seating groove through which the lamp is inserted is sized smaller than an outer diameter of the lamp tube.

22. The backlight assembly as claimed in claim 21, wherein the socket terminal comprises a lead coupling portion gripping the lead and mounted resiliently movable with respect to the socket housing.

23. The backlight assembly as claimed in claim 21, wherein the supporting member further comprises a connecting portion connected to the socket housing and gripping arms extending from the connecting portion in right and left directions and forming the tube seating groove surrounding a part of an outer circumference of the lamp tube.

24. The backlight assembly as claimed in claim 23, wherein the socket terminal comprises a lead coupling portion gripping the lead and the lead coupling portion is fixed to the socket housing.

25. The backlight assembly as claimed in claim 21, wherein the supporting member comprises a cushioning material and an entrance of the supporting member is sized to be equal to or greater than an outer diameter of the lamp tube.

26. The backlight assembly as claimed in claim 25, wherein the socket terminal comprises a lead coupling portion gripping the lead and fixed to the socket housing.

27. A liquid crystal display, comprising:
a liquid crystal display panel;
a lamp installed below the liquid crystal display panel, the lamp comprising a lead and a lamp tube; and
a lamp support unit supporting at least one end of the lamp, wherein the lamp support unit comprises:
a socket housing comprising a terminal receiving portion including a terminal receiving space;
a socket terminal disposed in the terminal receiving space of the socket housing and gripping the lead, the socket terminal comprising:
a first portion extending substantially parallel with a longitudinal direction of the lamp, and
a second portion continuous with the first portion, and extending substantially perpendicular to the first portion and the longitudinal direction of the lamp, the second portion gripping the lead of the lamp,
wherein the second portion of the socket terminal is disposed spaced apart from inner walls of the terminal receiving portion; and
a supporting member made of resin and installed to the socket housing and supporting the lamp tube, the supporting member forming a single unit with the socket housing,
wherein the supporting member comprises a tube seating groove in which the lamp tube is inserted, and an entrance of the tube seating groove through which the lamp is inserted is sized smaller than an outer diameter of the lamp tube.

28. The liquid crystal display as claimed in claim 27, wherein the socket terminal comprises a lead coupling portion gripping the lead and mounted resiliently movably with respect to the socket housing.

29. The liquid crystal display as claimed in claim 27, wherein the supporting member further comprises a connecting portion connected to the socket housing and gripping arms extending from the connecting portion in right and left directions and forming the tube seating groove surrounding a part of an outer circumference of the lamp tube.

30. The liquid crystal display as claimed in claim 29, wherein the socket terminal comprises a lead coupling portion gripping the lead and fixed to the socket housing.

31. The liquid crystal display as claimed in claim 27, wherein an entrance of the supporting member is sized to be equal to or greater than an outer diameter of the lamp tube.

32. The liquid crystal display as claimed in claim 31, wherein the socket terminal comprises a lead coupling portion gripping the lead and fixed to the socket housing.

* * * * *